US012331583B2

(12) United States Patent
Martin

(10) Patent No.: US 12,331,583 B2
(45) **Date of Patent: *Jun. 17, 2025**

(54) REVERSIBLE SURFACE-MOUNTED SLIDING SECURITY GATE

(71) Applicant: Rodney Hale Martin, Ponce de Leon, FL (US)

(72) Inventor: Rodney Hale Martin, Ponce de Leon, FL (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/346,216

(22) Filed: Jun. 12, 2021

(65) Prior Publication Data

US 2022/0290494 A1 Sep. 15, 2022

Related U.S. Application Data

(63) Continuation-in-part of application No. 17/200,803, filed on Mar. 13, 2021, now Pat. No. 11,512,522.

(51) Int. Cl.

*E06B 11/04* (2006.01)
*E05C 3/00* (2006.01)
*E05D 15/06* (2006.01)
*E06B 3/36* (2006.01)
*E06B 3/46* (2006.01)

(Continued)

(52) U.S. Cl.

CPC ............ *E06B 11/045* (2013.01); *E05C 3/004* (2013.01); *E05D 15/0665* (2013.01); *E05D 15/0686* (2013.01); *E06B 3/36* (2013.01); *E06B 3/4654* (2013.01); *E06B 5/00* (2013.01); *E06B 9/04* (2013.01); *E05Y 2201/684* (2013.01); *E05Y 2201/688* (2013.01); *E05Y 2800/426* (2013.01); *E05Y 2900/40* (2013.01); *E06B 2009/002* (2013.01); *G08B 13/00* (2013.01)

(58) Field of Classification Search

CPC ............................. E06B 11/045; E06B 3/4654
See application file for complete search history.

(56) References Cited

U.S. PATENT DOCUMENTS

| | | | | |
|---|---|---|---|---|
| 61,785 A * | 2/1867 | Wickham | E06B 11/045 | 49/427 |
| 63,757 A * | 4/1867 | Sears | E06B 11/045 | 49/427 |

(Continued)

FOREIGN PATENT DOCUMENTS

| | | | |
|---|---|---|---|
| GB | 2075564 A * | 11/1981 | E05D 15/0617 |
| GB | 2487270 A * | 7/2012 | E06B 11/02 |

*Primary Examiner* — Marcus Menezes

(57) ABSTRACT

The invention relates to a sliding security gate that can be surface mounted to a wall or door trim. These surface-mounted sliding security gates can be installed across any doorway opening of one's home for the protection of babies/toddlers, pets, and disabled elderly. On one hand, the Reversible Surface-Mounted Sliding Security Gate can be used as a dual functioned component that can be opened from either the left-hand or right-hand side of any wall or door trim; on the other hand, the Reversible Surface-Mounted Sliding Security Gate can become reversible and secured to the wall/door trim at the bottom of the bracket to secure the gate into place in order to provide safety and security to the vulnerable population listed above. In addition, this sliding security gate also has an alarm attached to the end of the security gate so that when it opens, the alarm sounds.

1 Claim, 10 Drawing Sheets

(51) Int. Cl.

| | |
|---|---|
| ***E06B 5/00*** | (2006.01) |
| ***E06B 9/04*** | (2006.01) |
| *E06B 9/00* | (2006.01) |
| *G08B 13/00* | (2006.01) |

(56) References Cited

U.S. PATENT DOCUMENTS

| | | | | |
|---|---|---|---|---|
| 83,550 | A * | 10/1868 | Rodgers | E06B 11/045 49/427 |
| 334,797 | A * | 1/1886 | Moose | E06B 3/50 49/156 |
| 729,925 | A * | 6/1903 | Fuller | E06B 11/045 49/427 |
| 2,190,149 | A * | 2/1940 | Coleman | E06B 3/4636 16/92 |
| 3,993,988 | A * | 11/1976 | Walter | G08B 13/08 340/548 |
| 4,723,374 | A * | 2/1988 | Peterson | E06B 11/045 49/404 |
| 5,579,608 | A * | 12/1996 | Dunn | E06B 11/045 49/404 |
| 5,873,205 | A * | 2/1999 | Hanlon | E04B 2/7416 49/404 |
| 2004/0003556 | A1 * | 1/2004 | Zerbst | E04B 2/7422 52/239 |
| 2022/0298859 | A1 * | 9/2022 | Hinojosa | E06B 11/026 |
| 2023/0287738 | A1 * | 9/2023 | Hinojosa | E06B 11/045 49/425 |

* cited by examiner

REVERSIBLE SURFACE-MOUNTED SLIDING SECURITY GATE

REFERENCE TO PENDING PRIOR PATENT APPLICATION

This patent application claims benefit of prior U.S. Non-provisional Utility patent application Ser. No. 17/200,803, filed Mar. 13, 2021, by this inventor, Rodney H. Martin, for INTERIOR PRE-HUNG HINGED DOOR AND POCKET SLIDING SECURITY GATE, which prior art is hereby incorporated herein by reference.

STATEMENT REGARDING FEDERALLY SPONSORED RESEARCH

Not Applicable

REFERENCE TO SEQUENCE LISTING

Not Applicable

FIELD OF INVENTION

The invention relates to a sliding security gate that can be surface mounted to a wall or door trim. This particular sliding security gate has a reversible feature that allows the gate to be used either on the left-hand side or the right-hand side of any wall or door trim.

BACKGROUND OF THE INVENTION

A security gate is an apparatus designed to keep pets, babies/toddlers, and the disabled elderly from entering into certain restricted areas of one's home, building, etc. These gates provide essential benefits for loved ones who are caring for these particular groups, including, but not limited to, safety issues, training techniques, security reasons, protection from potential harm, and peace of mind knowing their loved ones are safe and sound and are out of harms way.

Security gates are generally made of various materials, sizes, colors, and shapes. Some are permanently mounted; others are temporarily mounted. Both have different advantages and disadvantages to them; however, they both accomplish the same goal—to protect loved ones from entering into an area that could be dangerous for their well being.

BRIEF SUMMARY OF THE INVENTION

The present invention relates to a reversible surface-mounted sliding security gate that can be opened from either the left-hand or right-hand side of any wall or door trim. This is a dual-function product whereby it allows the functionality of an operating sliding security gate to be used on either side of the wall/door trim depending upon how the wall/door trim is positioned. This security gate is designed to sit on the floor on a wooden piece that allows the sliding security gate to move to an open and closed position. On the top of the security gate rests a mounting bracket that becomes reversible and can be secured to the wall/door trim at the bottom of the bracket to secure the gate into place. In addition, this sliding gate locks securely on the opposite side of the door. For added security, this sliding gate has an attached alarm to it whereby when the gate becomes opened, the alarm goes off and alerts those who are nearby to check on their loved ones. This invention can be put into already existing homes.

In comparison to previous gates, the Reversible Surface-Mounted Sliding Security Gate has the following advantages:

a. The sliding gate has the advantages of being a simple and compact gate, easily operated, and when not in use, can be slid in the open position and put out of the way.
b. The sliding gate is made of durable material; i.e., metal, plastic, wood, or composite, whereby it is strong and does not break. It does not have to be replaced due to wear and tear of poor manufactured products that are not safe and not secure.
c. The sliding gate has the added feature of having a reversible mounted bracket that can easily be fastened to either the right-hand or left-hand side of any wall/door trim.
d. An additional feature of this pocket sliding gate is the attached alarm component that when the gate becomes opened the alarm goes off to indicate that the security of the gate has been breached.
e. The sliding gate is firmly and securely locked/latched to the opposite door frame so that it cannot be knocked over whereby injuries can be sustained. Although this sliding gate is strong and durable and latches onto the door frame, the alarm feature is another safety and security component of this invention. It provides the gatekeeper peace of mind knowing that there is a dual security protection for the safety of their loved ones.
f. Lastly, when the gate is in the open position, it leaves the opening clear and free to pass through without obstructions.

This sliding gate has the durability of being strong, secure, and safe for babies and toddlers, pets, and the disabled elderly. It can be either a permanent fixture or a temporary fixture to the wall/door frame so that it does not have the tendency to break easily and is accessible to anyone who uses it. It is simple and easy to use and does not require a great deal of time in putting a sliding gate across a particular door for the safety and security of the ones' it is intended to protect.

FIG. **5*a*** shows a cross section of a top view.

FIG. **5*b*** shows a cross section trailing end side view.

FIG. **5*c*** shows a cross section leading end side view.

FIG. **5*d*** shows an elevation view of the lock and alarm receiver.

FIG. **5*e*** shows a cross section of a top view.

Figure 6:
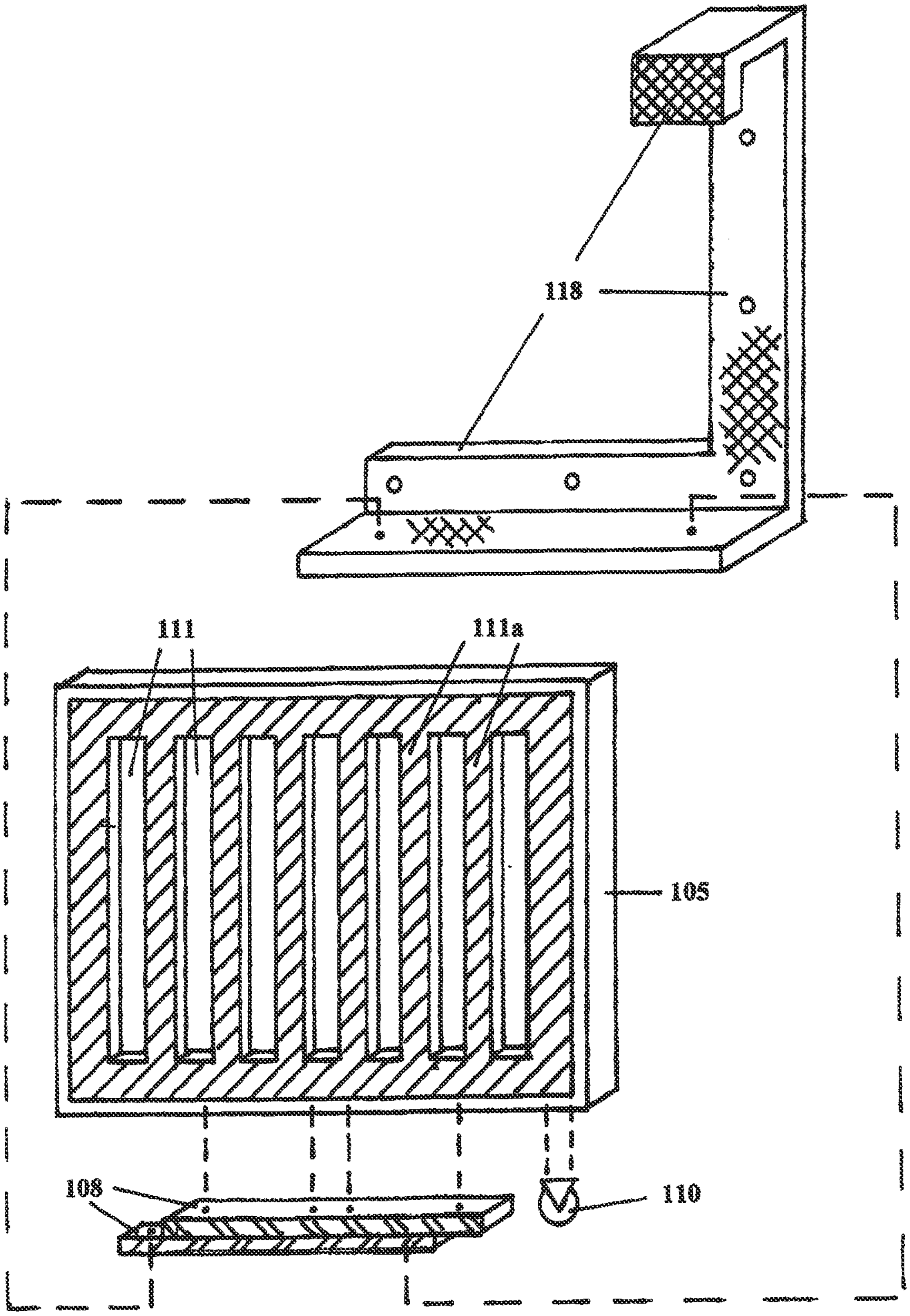

FIG. 6 shows an exploded view of the sliding security gate and mounting bracket and how its' parts fit together.

Figure 7:
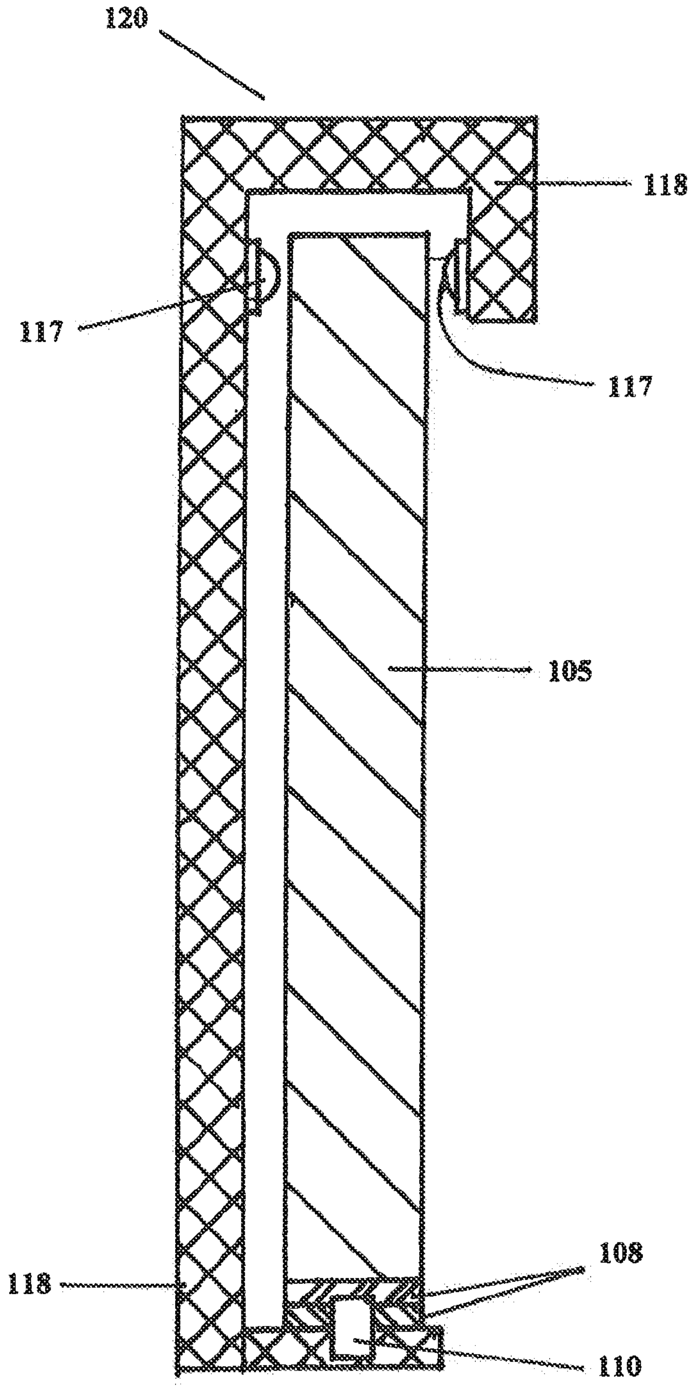

FIG. 7 shows an enlarged side view cross section of the invention.

Figure 8:
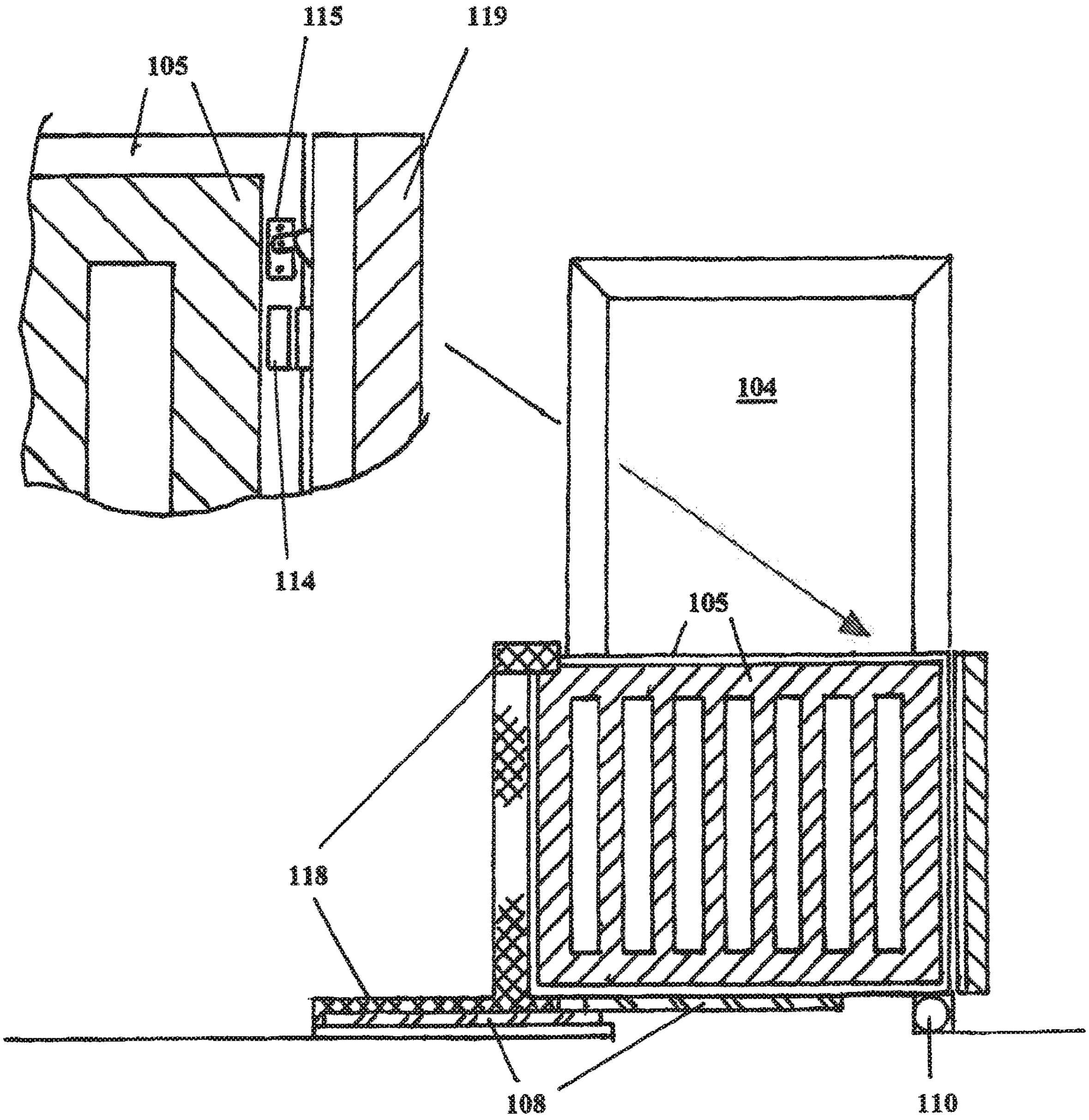

FIG. 8 shows the sliding gate closed across the door opening and locked, with an enlarged view of the latch and alarm location.

Figure 9:
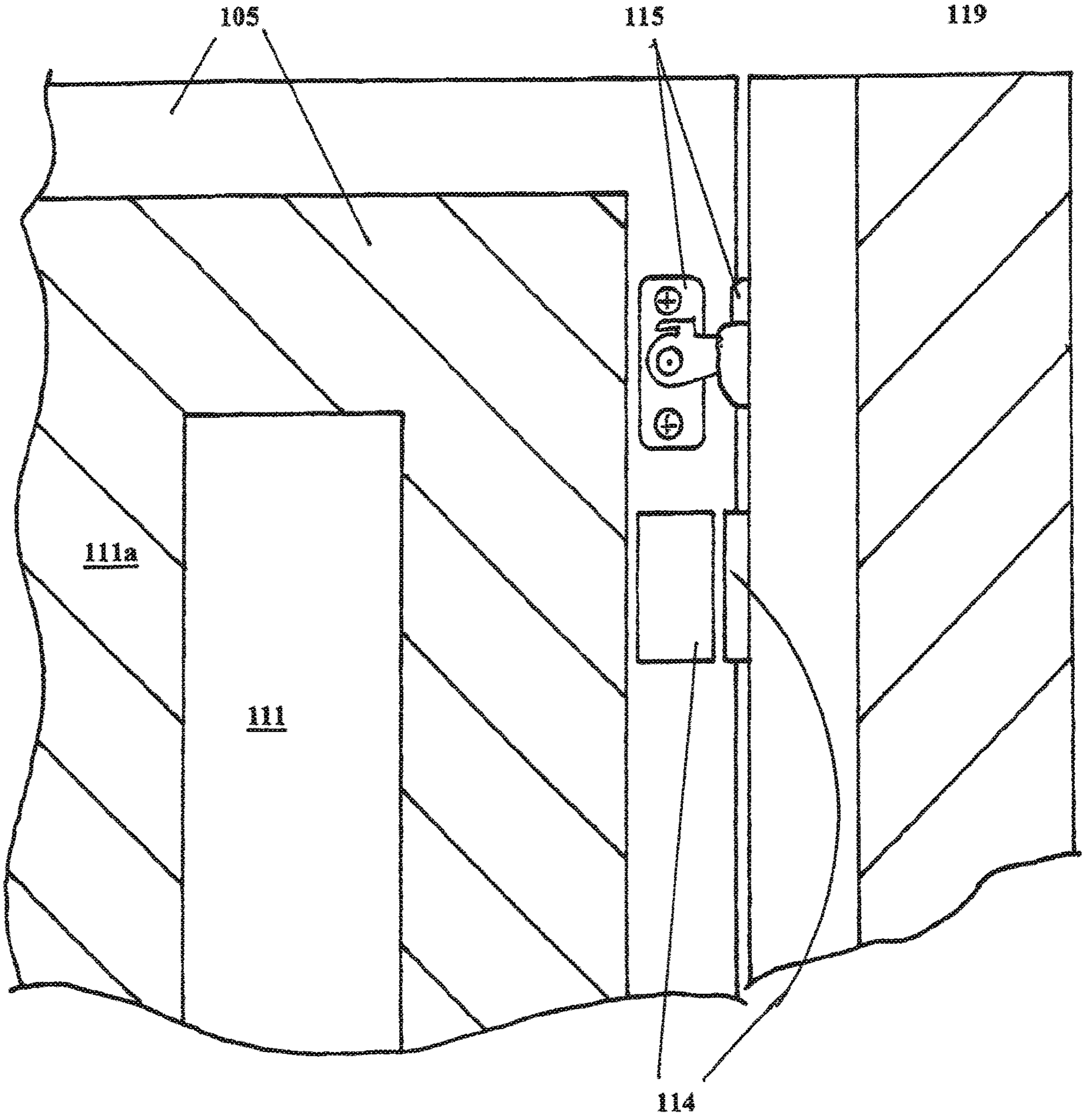

FIG. 9 shows a further enlarged view of the latch and alarm location and their configurations.

Figure 10:
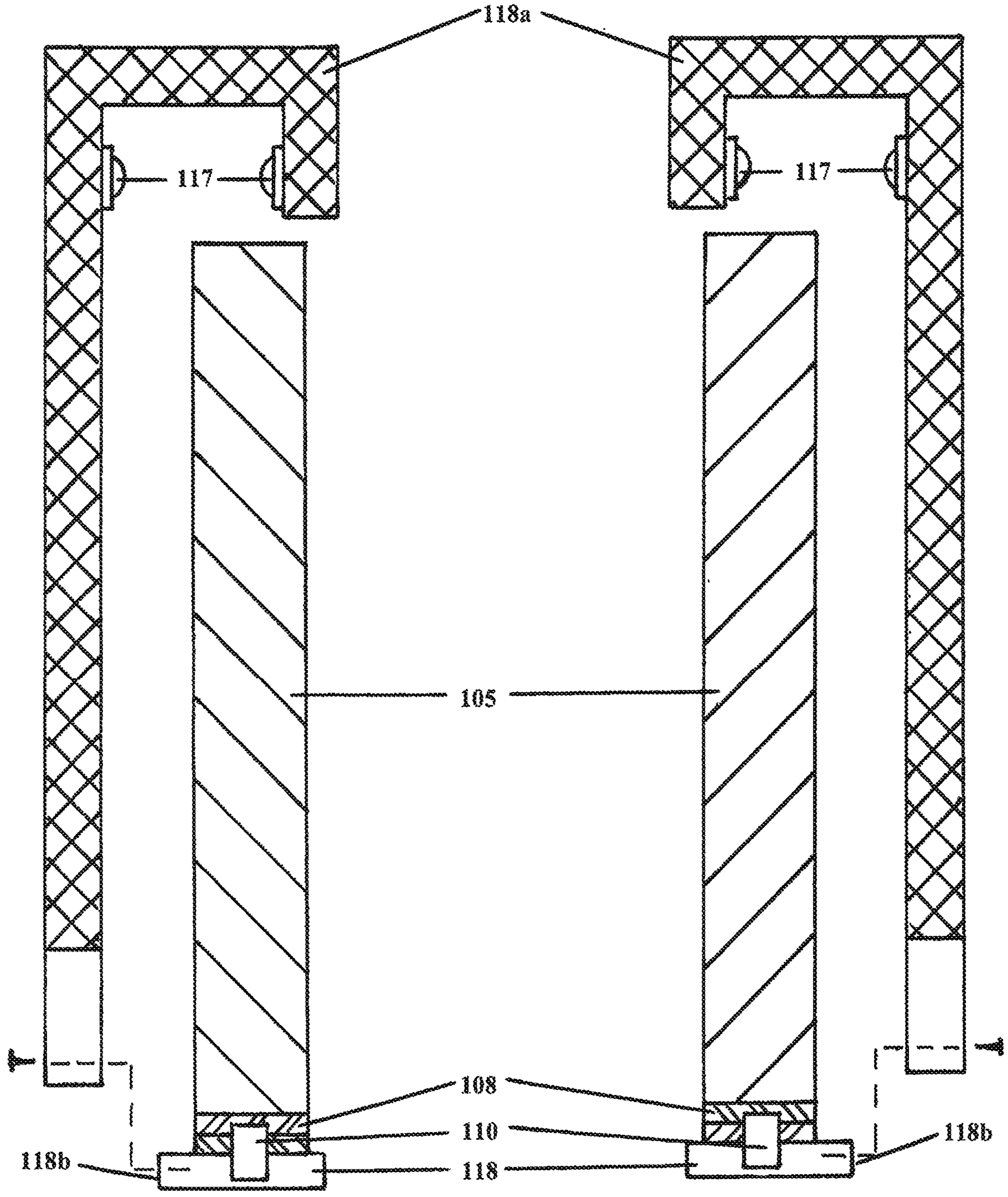

FIG. 10 shows a right- and left-hand leading end view to illustrate how to reverse the direction of travel.

COMPONENT LIST

104—Pass-Through Opening
105—Sliding Security Gate
108—Ball-Bearing Drawer Sliding Mechanism
110—Dolly-Style Wheel
111—Openings Between the Vertical Slats of the Security Gate
111*a*—Vertical Slats of the Security Gate
114—Battery-Operated Alarm
115—Right-Angle Latch
117—Plastic or Nylon Glides
118—Surface-Mounted Bracket
118*a*—Upper Portion of Surface-Mounted Bracket
118*b*—Lower Portion of Surface-Mounted Bracket
119—Lock and Alarm Receiver
120—Reversible Surface-Mounted Sliding Security Gate

DETAILED DESCRIPTION OF THE INVENTION

Detailed illustrated embodiments of the present invention are disclosed herein.

Figure 1:
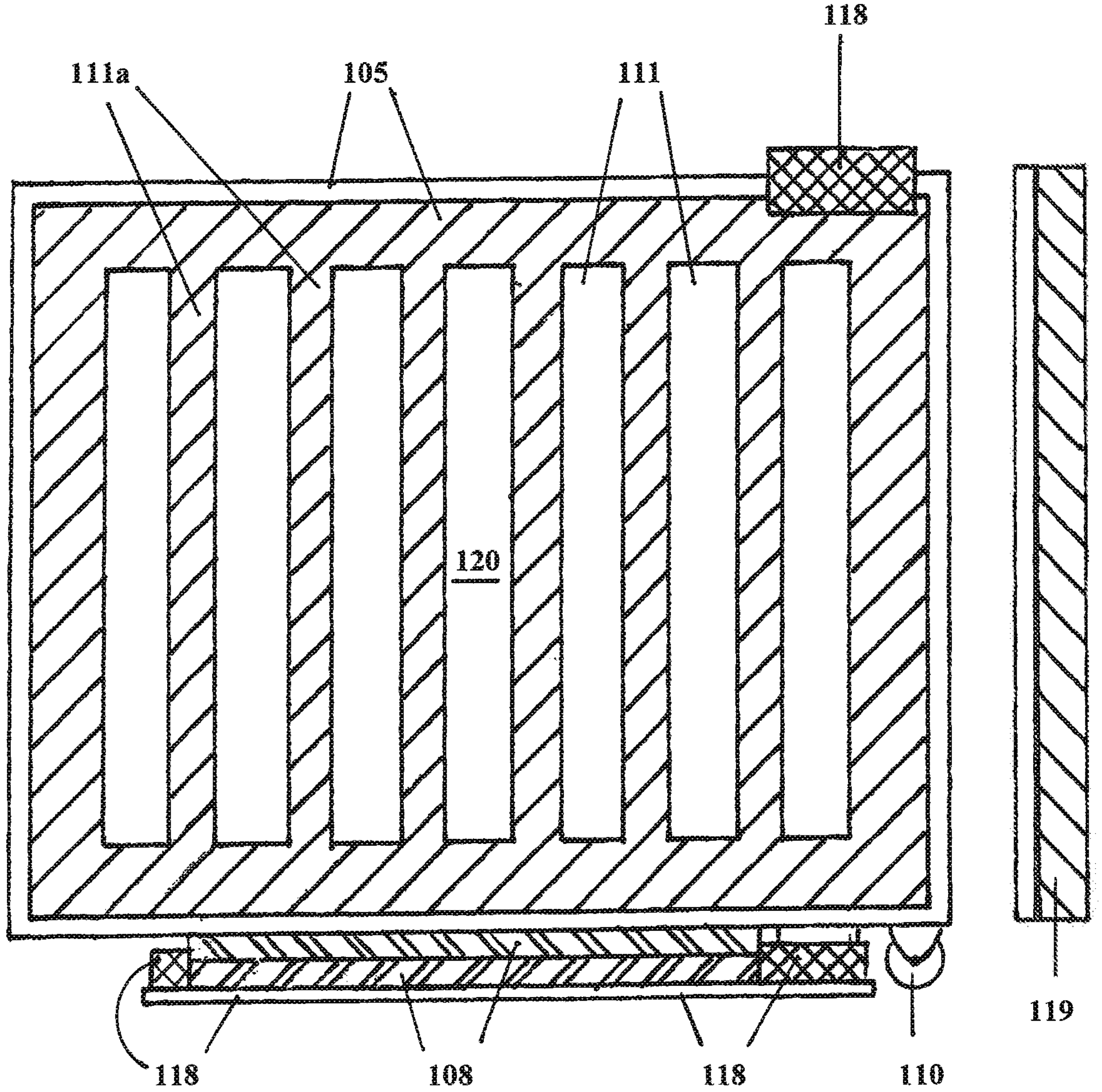
FIG. 1 shows the invention as it is—a sliding security gate put together with its reversible surface-mounted bracket.

FIG. 1 illustrates the elevation view of the invention, which is the Reversible Surface-Mounted Sliding Security Gate 120. The sliding security gate 105 put together with the surface-mounted bracket 118 will allow the surface-mounted sliding security gate to be attached to the left or the right side of an openings' surface. Reversing the direction of its sliding motion can be achieved by detaching the upright portion of the surface-mounted bracket 118 by unscrewing it and then turning the remaining bottom portion of the surface-mounted bracket 118 around 180° and reattaching the upright portion back to the opposite side of the bottom portion, thus enabling the sliding security gate 105 to slide in the opposite direction once it is mounted to the wall surface. FIG. 10 shows both right- and left-hand positions.

Figure 2:
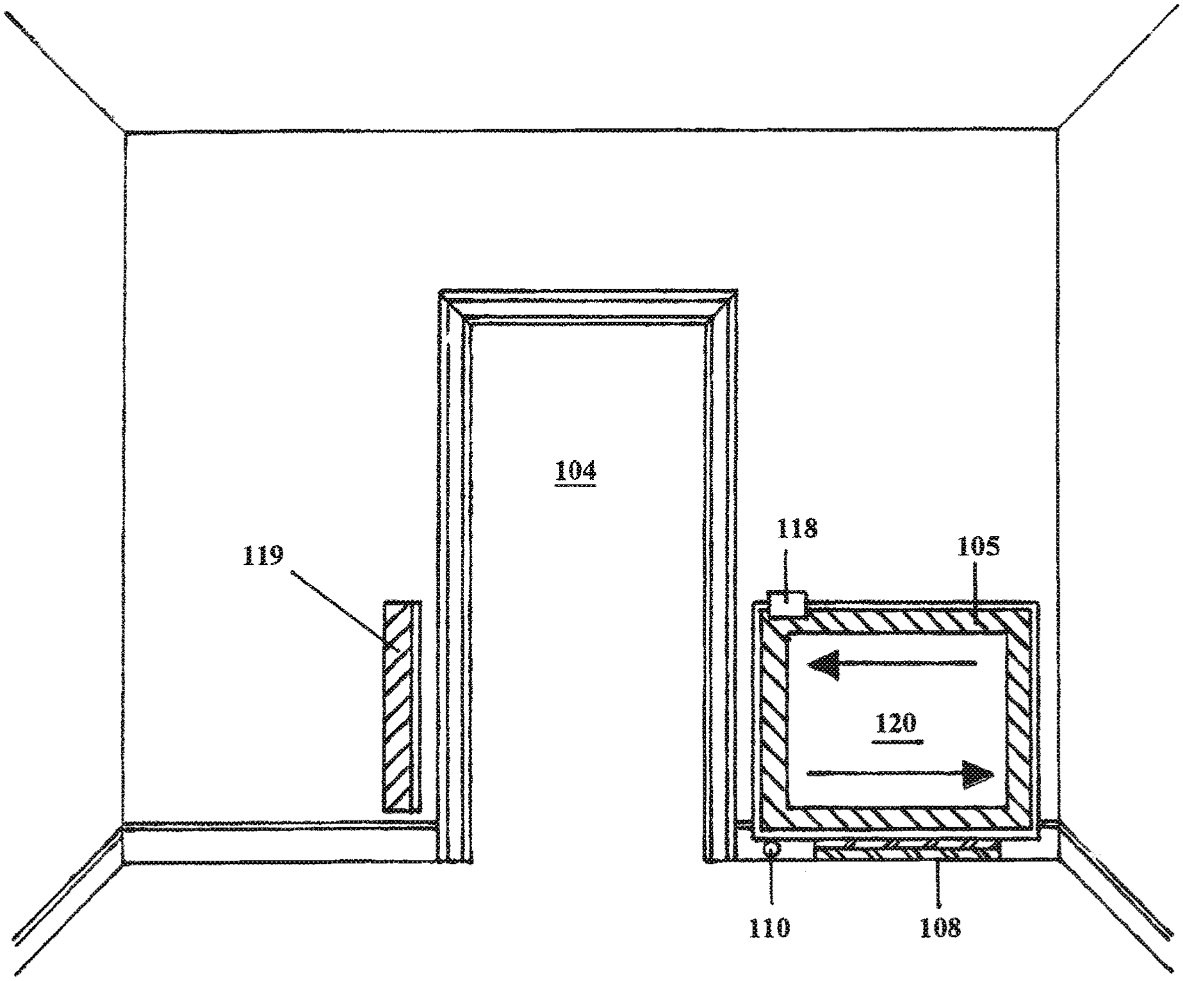
FIG. 2 shows an interior wall with a pass-through opening and the sliding security gate mounted to the wall surface to the right-hand side of the opening and arrows indicating how it slides in front of opening.

FIG. 2 illustrates an interior wall in a home or business with a pass-through opening 104 in it and the Reversible Surface-Mounted Sliding Security Gate 120 mounted to the wall surface with screws. On the opposite side of the pass-through opening 104 is the lock and alarm receiver 119 which is also mounted to the wall surface with screws. Once the sliding security gate 105 is against the lock and alarm receiver 119, they can be secured together and an alarm can be activated if desired.

Figure 3:
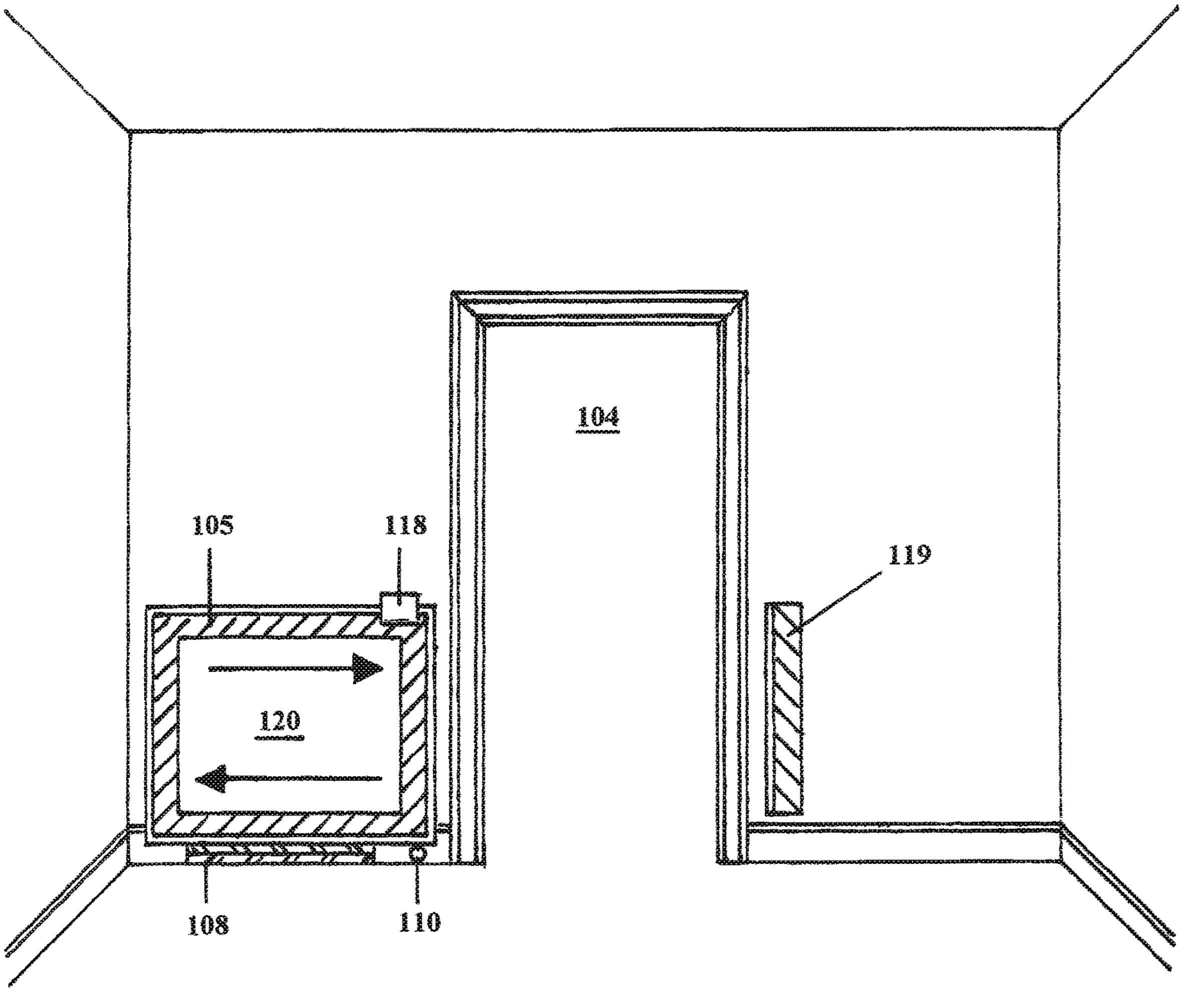
FIG. 3 shows an interior wall with a pass-through opening and the sliding security gate mounted to the wall surface to the left-hand side of the opening, sliding the opposite or reverse direction as FIG. 2.

FIG. 3 illustrates the Reversible Surface-Mounted Sliding Security Gate 120 mounted to the wall surface on the opposite side of the pass-through opening 104 as it was depicted in FIG. 2 to illustrate its reversible function.

Figure 4:
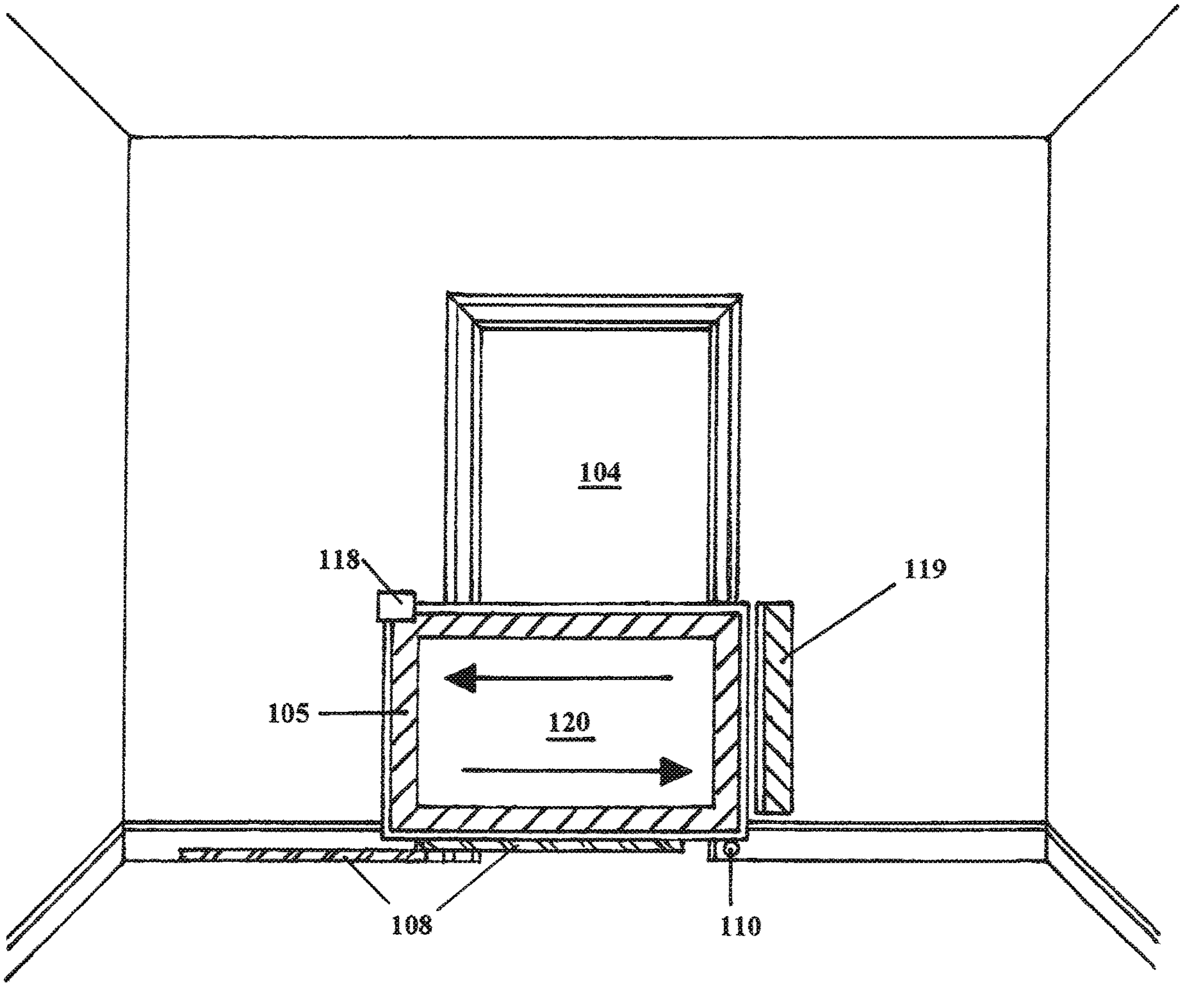
FIG. 4 shows an interior wall with a pass-through opening and the sliding security gate mounted to the wall surface in the closed position, securing the opening.

FIG. 4 illustrates the Reversible Surface-Mounted Sliding Security Gate 120 in the closed position across the pass-through opening 104, securing the opening while still allowing visibility from both sides.

Figures 5, 5A, 5B, 5C, 5D, 5E:
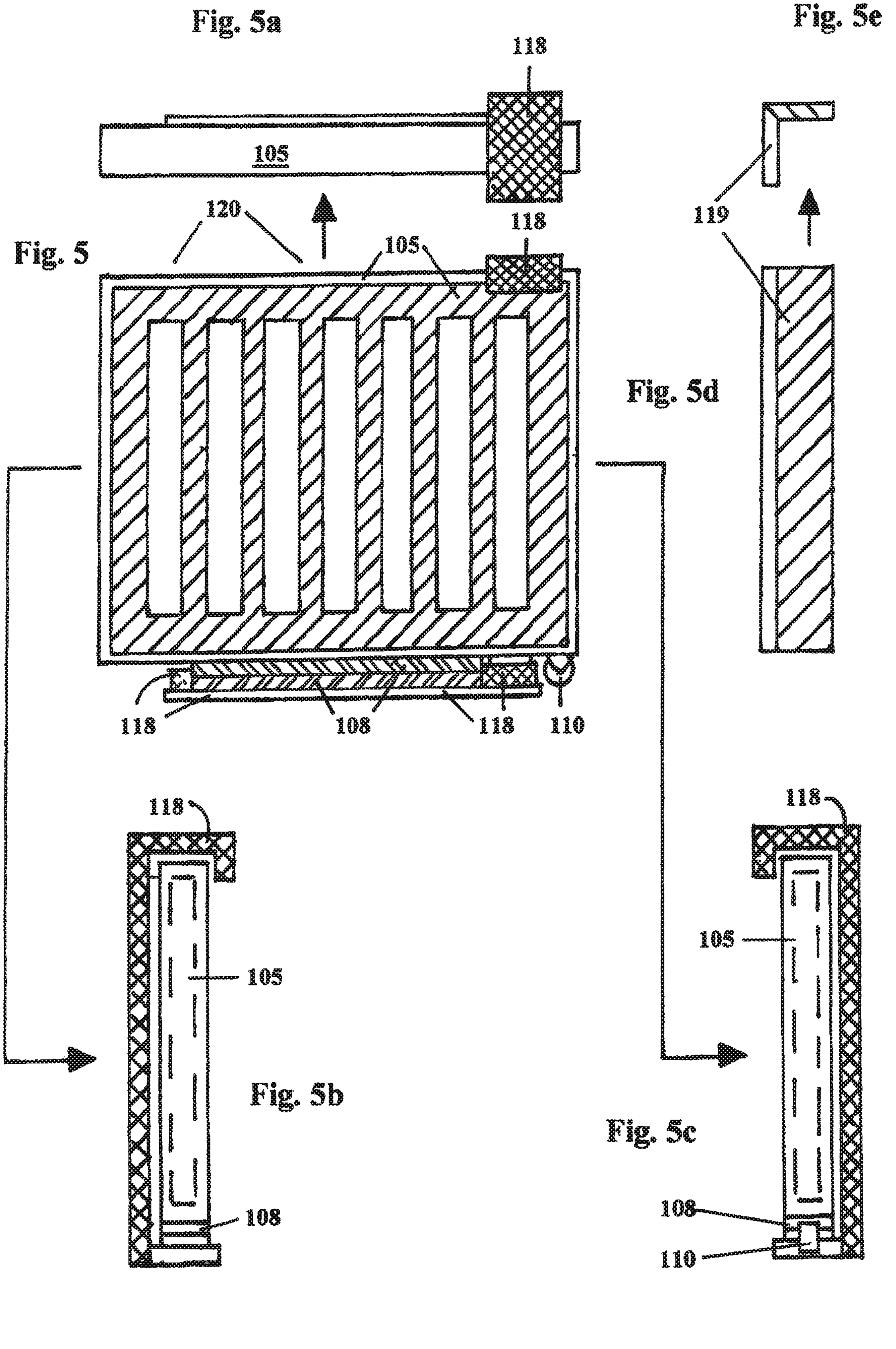
FIG. 5 shows an elevation view of the sliding security gate.

FIG. 5 illustrates an elevation view of the Reversible Surface-Mounted Sliding Security Gate 120.

FIG. 5*a* illustrates the top view of the Reversible Surface-Mounted Sliding Security Gate 120.

FIG. 5*b* illustrates the trailing end view of the Reversible Surface-Mounted Sliding Security Gate 120.

FIG. 5*c* illustrates the leading end view of the Reversible Surface-Mounted Sliding Security Gate 120.

FIG. 5*d* illustrates the lock and alarm receiver 119 elevation view.

FIG. 5*e* illustrates a top view of the lock and alarm receiver 119.

FIG. 6 illustrates an exploded three-dimensional view of the invention also showing how the different components go together.

FIG. 7 illustrates an enlarged end view of FIG. 5*c*.

FIG. 8 illustrates the invention positioned in front of the pass-through opening 104 with the sliding security gate 105 in the closed position and also showing an enlarged elevation view of the right-angle latch 115 and the battery-operated alarm 114 in their mounted position showing how they look with the sliding security gate 105 secured to the lock and alarm receiver 119.

FIG. 9 illustrates a further enlarged view of FIG. 8.

FIG. 10 illustrates the Reversible Surface-Mounted Sliding Security Gate 120 with its surface-mounted bracket 118 upper portion 118*a* removed from the lower portion 118*b* by unscrewing it. This detachment allows you to move the upper portion 118*a* of the surface-mounted bracket 118 to the other side of the lower portion 118*b* of the surface-mounted bracket 118 and be reattached. This allows the Reversible Surface-Mounted Sliding Security Gate 120 to be mounted to the opposite side of pass-through opening 104, reversing the direction it can slide, making it more versatile and convenient with different room and furniture configurations.

The disclosed embodiments have been described in full details of the structure and features of this invention, which comprises of a two-fold security gate apparatus—a sliding security gate that has a reversible feature that is surface mounted to any wall/door frame that is intended for the use of a safety gate that can open and close across the door opening. Several examples have been described that have been referenced to various disclosed embodiments. These embodiments are for the illustration purposes and are not limited in nature. This invention should not be limited to the design of the Reversible Surface-Mounted Sliding Security Gate and is not limited to the particular embodiments that are disclosed herein. It is however, intended to cover all modifications, changes, and adaptations within the scope of this present invention as is defined by the appended claim.

What is claimed is:

1. A sliding security gate together with a reversible surface-mounted bracket comprising:

a two-tier ball-bearing cabinet drawer slide mounted to a bottom underside of said sliding security gate, which provides said sliding security gate the ability to move from a closed position to an open position guided by said two-tier ball-bearing cabinet drawer slide;

said sliding security gate further comprising a dolly-style wheel on a leading end of said sliding security gate to support said leading end of said sliding security gate while being slid into the closed position and the open position; said sliding security gate is incorporated together with the reversible surface-mounted bracket, which holds said sliding security gate to a wall surface with a screw long enough to reaching a wall framing; whereby said two-tier ball-bearing cabinet drawer slide mounts to a bottom of said reversible surface-mounted bracket; wherein the reversible surface-mounted bracket is L-shaped, such that the length of the bottom of said reversible surface-mounted bracket is larger than the length of atop of said reversible surface-mounted bracket;

said sliding security gate further comprising a reversible feature whereby said reversible surface-mounted bracket can be separated by unscrewing an upper portion of said reversible surface-mounted bracket from a lower portion of said reversible surface-mounted bracket which sits on a floor, wherein the upper portion of said reversible surface-mounted bracket can be re-attached to an opposite side of the lower portion of said reversible surface-mounted bracket, thereby allowing said sliding security gate to be used on either a right-hand or a left-hand side of an opening;

said sliding security gate further comprising a latch that has two parts, one part of said latch is attached to said leading end of said sliding security gate and the other part of said latch is attached to a lock and alarm receiver;

said sliding security gate further comprising an alarm that has two parts, one part of said alarm is attached to said leading end of said sliding security gate and the other part of said alarm is attached to said lock and alarm receiver; said sliding security gate, when in the closed position against said lock and alarm receiver, can be secured with said latch and said alarm can be activated while still allowing to see past the opening.

* * * * *